United States Patent
Moon et al.

(10) Patent No.: US 9,439,072 B2
(45) Date of Patent: Sep. 6, 2016

(54) SYSTEM AND METHOD FOR AUTHENTICATION

(71) Applicant: TEAMBLIND INC., San Jose, CA (US)

(72) Inventors: Seong Uk Moon, Seoul (KR); Yeong Jun Jeong, Seoul (KR)

(73) Assignee: TEAMBLIND INC., San Jose, CA (US)

( * ) Notice: Subject to any disclaimer, the term of this patent is extended or adjusted under 35 U.S.C. 154(b) by 0 days.

(21) Appl. No.: 14/753,993

(22) Filed: Jun. 29, 2015

(65) Prior Publication Data

US 2015/0304849 A1    Oct. 22, 2015

Related U.S. Application Data

(63) Continuation of application No. PCT/US2014/064579, filed on Nov. 7, 2014.

(30) Foreign Application Priority Data

Nov. 8, 2013  (KR) .................. 10-2013-0135210
Oct. 15, 2014 (KR) .................. 10-2014-0139312

(51) Int. Cl.
| | |
|---|---|
| *H04W 12/06* | (2009.01) |
| *H04L 12/58* | (2006.01) |
| *H04W 12/04* | (2009.01) |
| *H04L 29/06* | (2006.01) |
| *H04W 84/12* | (2009.01) |

(52) U.S. Cl.
CPC .............. *H04W 12/06* (2013.01); *H04L 51/18* (2013.01); *H04L 63/065* (2013.01); *H04L 63/18* (2013.01); *H04W 12/04* (2013.01); *H04W 84/12* (2013.01)

(58) Field of Classification Search
CPC ..... H04W 12/06; H04W 88/02; G06F 12/14; G06F 15/173; G06F 15/16; H04L 9/00
USPC ...... 455/411; 380/282; 726/2, 3, 4; 713/170, 713/171
See application file for complete search history.

(56) References Cited

U.S. PATENT DOCUMENTS

| | | | |
|---|---|---|---|
| 7,225,249 B1 | 5/2007 | Barry et al. | |
| 2002/0152394 A1* | 10/2002 | Kadoya | ................. G06F 21/445 713/191 |
| 2003/0041263 A1 | 2/2003 | Devine et al. | |

(Continued)

OTHER PUBLICATIONS

International Search Report issued for corresponding International Patent Application No. PCT/US2014/064579, mailed Feb. 23, 2015.

*Primary Examiner* — Kamran Afshar
*Assistant Examiner* — Farid Seyedvosoghi
(74) *Attorney, Agent, or Firm* — Myers Wolin, LLC

(57) ABSTRACT

Provided is a system and method for authentication. The method includes receiving a subscription request from a user terminal, the subscription request executed by an authentication server communicating with the user terminal and including group discrimination data including a group code and information for discriminating a group from another, if it is determined that the group code and the information included in the group discrimination data correspond to each other, performing a group authentication procedure on the user terminal and processing the group authentication procedure as being successful, issuing a member session key to the user terminal, and providing a service requested by the user terminal in response to the service request including the member session key from the user terminal. In one embodiment, it is possible to prevent information on service users from being divulged.

14 Claims, 8 Drawing Sheets

(56) References Cited

U.S. PATENT DOCUMENTS

| | | |
|---|---|---|
| 2003/0161476 A1 | 8/2003 | Fransdonk |
| 2003/0191970 A1 | 10/2003 | Devine et al. |
| 2006/0129499 A1 | 6/2006 | Combar et al. |
| 2006/0274899 A1 | 12/2006 | Zhu et al. |
| 2007/0174618 A1 | 7/2007 | Nakano et al. |
| 2008/0034045 A1 | 2/2008 | Bardsley |

\* cited by examiner

SYSTEM AND METHOD FOR AUTHENTICATION

CROSS REFERENCE AND RELATED APPLICATIONS

The present patent application is a continuation application of international patent application number PCT/US14/064579, filed Nov. 7, 2014, now pending and is related to and claims the priority benefit of Korean Patent Application No. 10-2014-0139312, filed on Oct. 15, 2014 and Korean Patent Application No. 10-2013-0135210, filed Nov. 8, 2013, the content of each is hereby incorporated by reference in its entirety into this disclosure.

TECHNICAL FIELD

The present invention relates to a system and method for authentication enabling authentication and use of a service without recording information for discriminating a service user from another.

BACKGROUND ART

Recently, along with rapid progress in network technology and distribution of portable terminals, use of a variety of on-line services is rapidly increasing.

According to the rapid increase in the use of on-line services, service providers of the respective services indiscreetly collect personal information but cannot appropriately manage the collected personal information.

For example, Korean Patent Publication No. 10-2009-0056324 discloses a method for providing personal information of a user to other on-line sites once the user registers the personal information in an on-line site.

According to the conventional authentication methods, users' identities or other identity information susceptible to exposure to a third party due to divergence of personal information was left out of consideration in acquiring personal information of service users and performing authentication using the acquired personal information.

In particular, in the services requiring strict security to prevent identities of the service users, service providers' negligence or misconduct may bring about exposure of users' identities.

DISCLOSURE

In order to overcome the above-mentioned shortcomings, certain embodiments herein provide a system and method for authentication, which can prevent service users' identities from being exposed.

Certain embodiments herein also provides a system and method for authentication, which can prevent service users' identities from being exposed even by hacking of a terminal or server side of a service provider, negligence in information management or a manager's misconduct.

Certain embodiments herein also provides a system and method for authentication, which can store information provided by a service user during subscription and authentication procedures in such a manner that the information cannot be decoded from a side of a service provider's server.

Certain embodiments herein also provides a system and method for authentication, which can be implemented to discriminate individual users and to enable a service to be used just by receiving minimum information from a service user.

Certain embodiments herein also provides a system and method for authentication, which can be implemented to prevent an identity of a posting user posting bulletin content from being exposed by allowing the user to subscribe to a service through e-mail authentication and separating the information used in subscribing to the service and the information necessary to actually use the service.

Certain embodiments herein also provides a system and method for authentication, which can make only one activated service use account exist for one e-mail address for the purpose of operating a service in a secure manner.

According to an aspect of the invention, there is provided a method for authentication, the method including receiving a subscription request from a user terminal, the subscription request executed by an authentication server communicating with the user terminal and including group discrimination data including a group code and information for discriminating a group from another, if it is determined that the group code and the information included in the group discrimination data correspond to each other, performing a group authentication procedure on the user terminal and processing the group authentication procedure as being successful, issuing a member session key to the user terminal, and providing a service requested by the user terminal in response to the service request including the member session key from the user terminal.

According to another aspect of the invention, there is provided a method for authentication, the method including providing a user interface executed by a user terminal communicating with an authentication server through a network to receive group discrimination data including a group code and information for discriminating a group from another, receiving the group code and the group discrimination data, and transmitting a subscription request including the group code and the group discrimination data to the authentication server, if group authentication for the user terminal is processed as being successful from the authentication server, receiving and encrypting a password entered by a user, encrypting the group discrimination data using the password, and transmitting the encrypted password and the encrypted group discrimination data to the authentication server, and if a member session key is received from the authentication server, storing the member session key and transmitting a service request for the authentication server, the service request including the member session key to be offered with a service provided by the authentication server.

As described above, according to certain embodiments herein, the system and method for authentication can prevent service users' identities from being exposed.

In addition, according to certain embodiments herein, the system and method for authentication can prevent service users' identities from being exposed even by hacking of a terminal or server side of a service provider, negligence in information management or a manager's misconduct.

According to certain embodiments herein, the system and method for authentication can store information provided by a service user during subscription and authentication procedures in such a manner that the information cannot be decoded from a side of a service provider's server.

According to certain embodiments herein, the system and method for authentication can be implemented to discriminate individual users and to enable a service to be used just by receiving minimum information from a service user.

According to certain embodiments herein, the system and method for authentication can be implemented to prevent an identity of a posting user posting bulletin content from being exposed by allowing the posting user to subscribe to a service through e-mail authentication and separating the information used in subscribing to the service and the information necessary to actually use the service.

According to certain embodiments herein, the system and method for authentication can make only one activated service use account exist for one e-mail address for the purpose of operating a service in a secure manner.

BRIEF DESCRIPTION OF THE DRAWINGS

The objects, features and advantages of certain embodiments herein will be more apparent from the following detailed description in conjunction with the accompanying drawings, in which.

DETAILED DESCRIPTION

Certain embodiments herein will now be described in detail with reference to a few preferred embodiments as illustrated in the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Thus, in some embodiments, well-known structures and devices are not shown in order not to obscure the description of the invention with unnecessary detail. Like numbers refer to like elements throughout.

It will be understood that when an element or layer is referred to as being "connected to" another element or layer, it can be directly connected or electrically connected to the other element or layer or intervening elements or layers may be present. It will be also understood that the term "comprises" when used in this specification, specify the presence of stated elements, but do not preclude the presence or addition of one or more other elements, unless otherwise defined.

Hereinafter, certain embodiments herein will be described in further detail with reference to the accompanying drawings.

Figure 1:
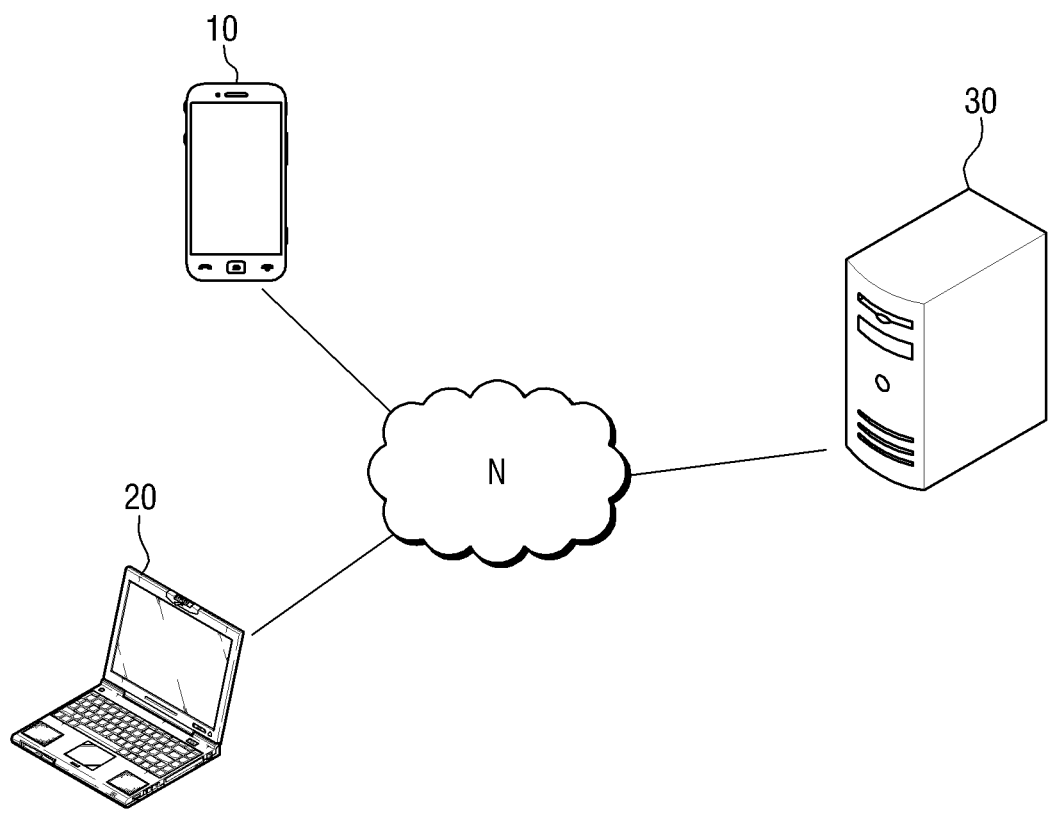
FIG. 1 is a network diagram illustrating a configuration of an authentication system according to an embodiment of the invention.
Figure 2:
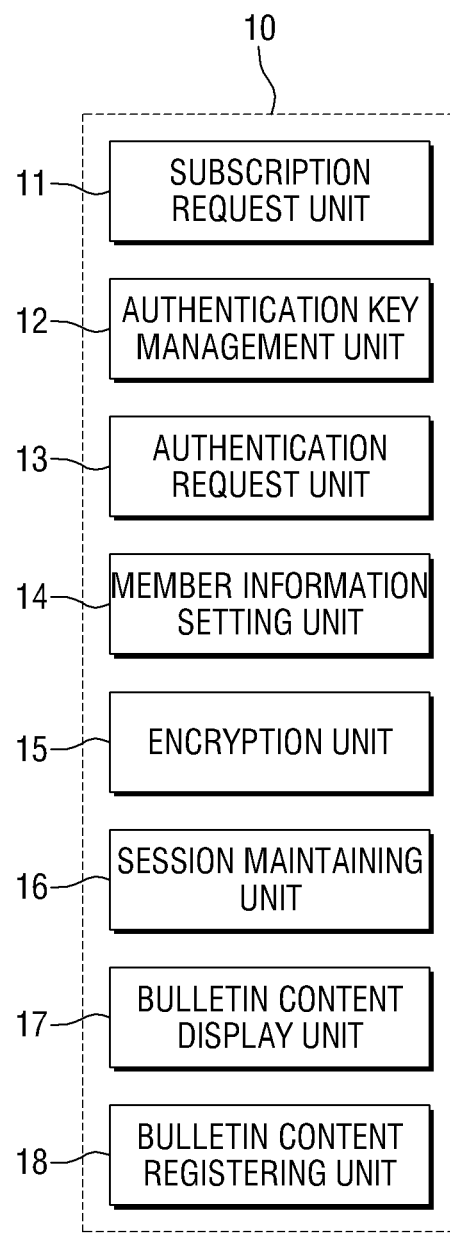
FIG. 2 is a block diagram illustrating a functional configuration of a user terminal included in the authentication system according to an embodiment of the invention.
Figure 3:
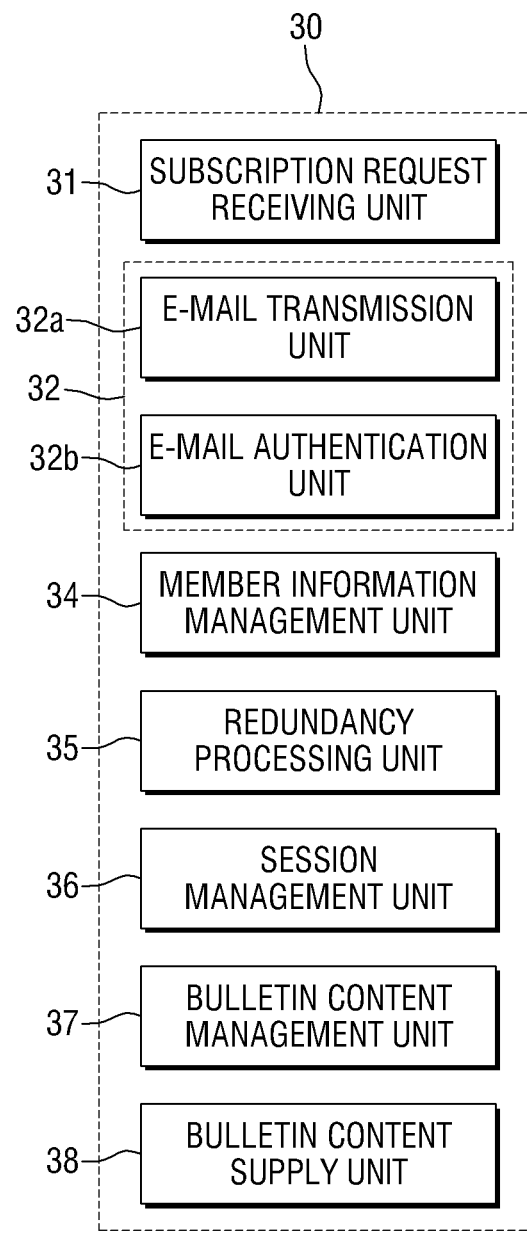
FIG. 3 is a block diagram illustrating a functional configuration of an authentication server included in the authentication system according to an embodiment of the invention.

FIG. 1 is a network diagram illustrating a configuration of an authentication system according to an embodiment, FIG. 2 is a block diagram illustrating a functional configuration of a user terminal included in the authentication system according to an embodiment and FIG. 3 is a block diagram illustrating a functional configuration of an authentication server included in the authentication system according to an embodiment.

First, as shown in FIG. 1, the authentication system according to an embodiment includes a user terminal 10 and an authentication server 30 connected to a network N. Additionally, the authentication system according to an embodiment may further include an e-mail authentication terminal 20. Here, the e-mail authentication terminal 20 may be a terminal that is physically identical with the user terminal 10 or may be a separate terminal.

Here, the network N may be implemented by all kinds of wired/wireless network, such as a local area network (LAN), a wide area network (WAN), a value added network (VAN), a personal area network (PAN), a mobile radio communication network or a satellite communication network.

The user terminal 10 and the e-mail authentication terminal 20 are communication terminals connected to a server of a remote location through the network N and may be implemented by a portable terminal that can be connected to another terminal or server. The portable terminal may be, for example, a wireless communication device having portability and mobility guaranteed, such as a personal communication system (PCS), a global system for mobile communications (GSM), a personal digital cellular (PDC), a personal handyphone system (PHS), a personal digital assistant (PDA), an international mobile telecommunication (IMT)-2000, a code division multiple access (CDMA)-2000, a W-code division multiple access (W-CDMA), a wireless broadband internet (Wibro) terminal, a smart phone, a tablet computer and all kinds of handheld wireless communication device. Here, the user terminal 10 is a terminal used by a user of an on-line service provided by an operator of the authentication server 30. The e-mail authentication terminal 20 is a terminal for receiving an authentication e-mail transmitted from the authentication server 30. The user terminal 10 and the e-mail authentication terminal 20 are simply divided by functions. As described above, the user terminal 10 and the e-mail authentication terminal 20 may be the same with or different from each other.

An application for communicating with the authentication server 30 and providing an on-line service provided by the operator of the authentication server 30 may be installed in the user terminal 10. A web browser or a separate e-mail application may be installed in the e-mail authentication terminal 20 to receive and display the authentication e-mail transmitted from the authentication server 30 through an e-mail server (not shown) or preparing the authentication e-mail transmitted from the e-mail authentication terminal 20 to the authentication server 30. In describing certain embodiments, the meaning of the expression 'authentication e-mail' will later be described.

Meanwhile, the authentication server 30 communicates with a plurality of user terminals 10 through the network N and provides an on-line service, discriminates each of the user terminals 10 through a user authentication procedure of the user terminal 10 and provides the service corresponding to the discriminated user terminal 10.

Here, the service provided by the authentication server 30 is not limited to a particular service. However, the service provided by the authentication server 30 may be, for example, a service shared by a plurality of users by registering bulletin content, such as an on-line bulletin board service or an on-line community service. In particular, in an embodiment, the authentication server 30 allows each user to select or enter the name of a group to which the user belongs and authenticates the user's membership of the group and provides only the user authenticated as a member of the group with bulletin content associated with the group or allows the authenticated user to subscribe in a community of the group.

Hereinafter, configurations of the user terminal 10 and the authentication server 30 will be described in detail. Before describing the configurations of the user terminal 10 and the authentication server 30, terms used herein will first be defined as follows.

The term 'group' is used to mean a variety of organizations to which individuals belong and may include, for example, all types of organizations formed by the individuals gathering to achieve the same objective. That is to say, the 'group' may include all types of organizations conceptually or socially grouped or grouped with or without intention.

In an embodiment, the group authentication may be executed by an e-mail. To this end, a group code for discriminating each group and a format of an e-mail address corresponding to each group code may be stored in the authentication server 30. Here, the format of the e-mail address may be set as a string of a host address part excluding a part for discriminating a user.

For example, assuming that an e-mail address of 'Kim Minho' who is a student of 'Seoul National University' is 'kmh@snu.ac.kr', and a host address of the e-mail service actually hosted by Seoul National University is 'snu.ac.kr', the authentication server 30 may execute group authentication by confirming whether a part following after '@' in the e-mail address, 'kmh@snu.ac.kr' entered by 'Kim Minho', is identical with a host address part of the e-mail service, i.e., 'snu.ac.kr' provided from Seoul National University.

In group authentication, in order to confirm whether the user's entered e-mail address is identical with the e-mail address that is actually used by the user, the authentication server 30 may transmit an e-mail for authentication (to be referred to as 'authentication e-mail' hereinafter) to the e-mail address entered by the user and user's confirmation for the authentication e-mail may be authenticated.

For example, the authentication e-mail may be transmitted to the e-mail address 'kmh@snu.ac.kr' entered by 'Kim Minho' to authenticate e-mail confirmation within a preset time.

Here, a variety of methods for detecting whether the user has confirmed the authentication e-mail or not may be employed. In an example, after an 'authentication link' to be described later is embedded in the authentication e-mail transmitted from the authentication server 30 to then be transmitted, if the authentication link is selected by the e-mail authentication terminal 20 that has received the authentication e-mail, it is determined that the user has confirmed the authentication e-mail, which will later be described in more detail.

In another example, an 'authentication link' to be described later is embedded in the authentication e-mail transmitted from the authentication server 30 to then be transmitted. The user is allowed to confirm a 'string for authentication' embedded in the authentication e-mail included in the authentication e-mail through the e-mail authentication terminal 20, and if the user who has confirmed the 'string for authentication' accurately enters the confirmed 'string for authentication' through the user terminal 10 within a preset time, it is determined that the authentication e-mail is confirmed by the user.

As described above, a group authentication method is executed such that the authentication server 30 transmits the authentication e-mail including an authentication link or a string for authentication to group e-mail addresses entered by the user, which is to be referred to as a first embodiment.

In a second embodiment of another group authentication method, if the user enters an e-mail address for group authentication, after the authentication server 30 confirms whether the user's entered e-mail address corresponds to a pre-stored e-mail address format for the group selected by the user, an e-mail address of a manager of the authentication server 30 may be provided to the user to allow the user to transmit the authentication e-mail to the manager of the authentication server 30, that is, to a service operator. According to certain embodiments, 'keyword for authentication' to be recorded in the authentication e-mail by the user may optionally be provided.

In addition, if the authentication e-mail (including the keyword for authentication in a main text) is transmitted to the manager of the authentication server 30 using the group e-mail address identical with the user's entered e-mail address, the authentication procedure may be completed by confirming the address of the e-mail transmitted by the user when the authentication e-mail is confirmed. Here, the authentication server 30 may process the group authentication as being successful only when the keyword for authentication, additionally provided to the user, and the keyword for authentication, included in the received e-mail, are identical with each other as the result of comparison. Here, in order to process the group authentication as being successful, it may be confirmed whether an IP address of a mail server that has transmitted the authentication e-mail received from the user is correct or not, and a sender and a recipient of the received authentication e-mail, and keywords included in the main text of the mail may be compared with the e-mail address entered by the user, the e-mail address provided to the user (i.e., receiving mail address), and keywords for authentication, provided to the user. In the aforementioned second embodiment, the authentication server 30 may provide only the operator's e-mail address to the user who intends to proceed with a subscription procedure by entering the group e-mail address but may not provide the keyword for authentication. In this case, the user may succeed in the group authentication by transmitting the authentication e-mail having the operator's e-mail address as a recipient using the user's own group e-mail address.

Further, according to a third embodiment of group authentication, group authentication may be executed using information other than the e-mail address. For example, the authentication server 30 may pre-store intrinsic IP addresses of wireless LAN access points used by the respective groups, or identifier information, such as SSID by group. In addition, the authentication server 30 may pre-store information on off-line addresses of the respective groups.

The authentication server 30 may perform user authenticate as to whether the user is a member of a particular group by comparing at least one of information on the identifier of the wireless LAN access point accessed by the user terminal 10 and a current position of the user terminal 10 of the user who intends to subscribe in the service of the particular group as a member with an identifier and an off-line address of a wireless LAN access point of a pre-stored group.

Meanwhile, the term 'member authentication' is used to mean a procedure of endowing an intrinsic key for granting a subsequent service connection of the user terminal 10 to the user terminal 10 having completed the group authentication (to be referred to as 'session key').

In an embodiment, the authentication server 30 receives a password from the user of the user terminal 10 having completed the group authentication, encrypts information concerning the user or the user terminal 10 to be registered in the authentication server 30 and executes the procedure of endowing the session key that is characteristic for each user terminal 10, thereby completing the member authentication.

Hereinafter, functional configurations of the user terminal 10 according to an embodiment will be described using the terms defined above.

As shown in FIG. 2, the user terminal 10 includes a subscription request unit 11. As described above, the subscription request unit 11 provides a user interface allowing the user who executes an application installed in the user terminal 10 to select a group to which the user belongs to transmit a request for subscription to on-line service for the group to the authentication server 30.

First, the subscription request unit 11 may allow the user to enter a group name or to select one of a plurality of pre-stored groups. In a case where the user enters a group name, the subscription request unit 11 may search for a pre-stored group name corresponding to a string of the entered group name to then display the same, thereby selecting the group to which the user belongs. Here, a group code for discriminating a group may be matched with the user's selected group, and the subscription request unit 11 may transmit the group code to the authentication server 30 when transmitting the information on the user's selected group to the authentication server 30.

In addition, as described above, the subscription request unit 11 may receive the e-mail address from the user in the format of a string and may transmit the received string together with the group code to the authentication server 30.

Accordingly, the authentication server 30 may execute the group authentication using the received group code and the e-mail address. As described above, the subscription request unit 11 may transmit the group code and the identifier of the wireless LAN access point or the current position information to the authentication server 30 according to embodiment.

Meanwhile, the user terminal 10 may include an authentication key management unit 12. The 'authentication key' managed by the authentication key management unit 12 is received from the authentication server 30. As described above, if the subscription request unit 11 provides the group code and the e-mail address to the authentication server 30, the authentication server 30 confirms whether the received information corresponds to the e-mail address format of the selected group code and then transmits the authentication e-mail to the received e-mail address. Here, the authentication server 30 may notify the user terminal 10 of transmittal of the authentication e-mail and may simultaneously provide the 'authentication key' to the user terminal 10. Here, the authentication key is an intrinsic pseudorandom key newly generated whenever the authentication e-mail is transmitted.

Here, the notification of the transmittal of the authentication e-mail from the authentication server 30 to the user terminal 10 will now be referred to as 'authentication e-mail transmittal notification'.

Accordingly, the authentication key management unit 12 may store the received authentication key while receiving the authentication e-mail transmittal notification. In addition, when completion of the confirmation for the authentication e-mail is later notified, the authentication key management unit 12 provides the stored authentication key to an authentication request unit 13 to be described later. Here, the authentication key that is received and stored by the authentication key management unit 12 together with the authentication e-mail transmittal notification will now be referred to as a 'first authentication key'.

In addition, in the second embodiment of group authentication, when the authentication server 30 receives an e-mail address from the user terminal 10, confirms whether the received e-mail address has a format corresponds to the user's selected group and then provides an operator's e-mail address to which the user may send an authentication e-mail, and selectively provides keywords for authentication to the user terminal 10 according to embodiment, an authentication key may be generated to then be transmitted to the user terminal 10 and the authentication key management unit 12 may store the generated authentication key. That is to say, in the present embodiment, the authentication key may be an intrinsic pseudorandom key newly generated whenever a receiving address of the authentication e-mail to be received from the user (operator's e-mail address) and keywords for authentication are provided to the user.

In addition, in the third embodiment of group authentication, when the subscription request unit 11 of the user terminal 10 transmits the group code and the identifier of the wireless LAN access point and the current position information to the authentication server 30, the authentication server 30 may compare the received information with pre-registered information for the group corresponding to the received group code and may send the authentication key to the user terminal 10. Accordingly, the authentication key management unit 12 may store the authentication key received from the authentication server 30. Here, the authentication key may be an intrinsic pseudorandom key newly generated whenever the information received from the user is compared with the information on the group stored in the authentication server 30 to execute group authentication.

Meanwhile, the user terminal 10 according to an embodiment may include the authentication request unit 13. The authentication request unit 13 is configured to request for final authentication for completing group authentication to the authentication server 30 to enable member authentication.

The authentication server 30 transmits again the authentication key transmitted together when the authentication e-mail transmittal notification is provided to the user terminal 10 when notifying the user terminal 10 of the completion of confirmation for the authentication e-mail.

Here, the notification of completion of confirmation for the authentication e-mail, which is transmitted from the authentication server 30 to the user terminal 10, will now be referred to as an 'authentication e-mail confirmation notification' and the authentication key received in the user terminal 10 will now be referred to as a 'second authentication key'. The 'authentication e-mail confirmation notification' is a notification generated in a case where it is confirmed that the user has browsed the authentication e-mail when the authentication server 30 transmits the authentication e-mail according to the first embodiment. The confirmation may be achieved by confirming whether an authentication link included in the authentication e-mail is selected (whether a request including URL information corresponding to the authentication link is received in the authentication server 30) or whether the string for authentication included in the authentication e-mail is transmitted to the authentication server 30 through the user terminal 10, as described above.

Therefore, the authentication request unit 13 compares the second authentication key received together when the authentication e-mail confirmation notification is received with the first authentication key received and stored by the authentication key management unit 12 together with the authentication e-mail transmittal notification and confirms whether the compared keys are identical with each other or not. Only when the compared keys are identical with each other, the authentication request unit 13 may transmit the identical authentication key and the e-mail address to the authentication server 30, thereby confirming whether the group authentication has been successfully completed or not.

According to embodiment, the authentication key may not be included in the authentication e-mail transmittal notification but may be included in only the authentication e-mail confirmation notification, so that the authentication request unit 13 may inquire the authentication server 30 whether the group authentication has been successfully completed or not, using only the authentication key included in the authentication e-mail confirmation notification without comparison of authentication keys. Alternatively, if the authentication key is included in only the authentication e-mail transmittal notification but is not included in the authentication e-mail confirmation notification and the authentication request unit 13 receives the authentication e-mail confirmation notification, the authentication request unit 13 may transmit the authentication key included in the authentication e-mail transmittal notification to the authentication server 30, thereby inquiring whether the group authentication corresponding to the authentication key has been successfully completed or not.

Meanwhile, in the second embodiment of group authentication, the authentication server 30 may also transmit the first authentication key together when the operator's e-mail address to which the user is to send the authentication e-mail (optionally including keywords for authentication) is notified the user terminal 10 (to be referred to as an 'authentication e-mail receiving address notification' hereinafter).

When the authentication e-mail (including the keywords for authentication in the main text) is sent to the receiving address after the user confirms the authentication e-mail receiving address notification, if the authentication server 30 confirms the authentication e-mail, the authentication e-mail confirmation notification may be transmitted again to the user terminal 10 together with the second authentication key.

In the second embodiment, the first authentication key and the second authentication key are not necessarily discriminated from each other. Rather, an authentication key may be allowed to be included in at least one of two notifications sequentially transmitted.

Meanwhile, in the third embodiment of group authentication, when the authentication server 30 receives the identifier of the wireless LAN access point or the current position information with the group code from the user terminal 10, the authentication key corresponding to the user terminal 10 may be generated to then be transmitted to the user terminal 10. Here, the authentication server 30 may notify the user terminal 10 whether the received identifier of the wireless LAN access point or the current position information corresponds to the user's selected group and whether the group authentication has been successfully completed. Next, the user may perform a member authentication procedure using the authentication key included in the notification. That is to say, in the third embodiment of group authentication, the authentication request unit 13 confirms whether the final group authentication by the authentication server 30 has been successfully completed using the authentication key included in the notification received from the authentication server 30 and then performs the member authentication procedure.

Further, the user terminal 10 according to an embodiment may include a member information setting unit 14. The member information setting unit 14 may receive a password from the user and may provide information pieces associated with the user, including the password, to the authentication server 30.

Here, the encryption unit 15 may encrypt the received password and e-mail address to allowing the information concerning the user, stored in the authentication server 30, in an encrypted state, thereby completing the member authentication procedure.

To this end, if a response indicating that the group authentication has been successfully completed is received in the user terminal 10 from the authentication server 30 in response to the confirmation whether the group authentication for the authentication server 30 of the authentication request unit 13 is completed or not, the member information setting unit 14 may provide a user interface to receive the password from the user. Here, the 'password' may include a simple string of digits or a string of digits and characters. Further, it is obvious that the password may be patterned with a particular track.

Next, the encryption unit 15 may encrypt the e-mail address received by the subscription request unit 11 using the input password. In addition, the encryption unit 15 may encrypt the input password itself. Accordingly, the member information setting unit 14 may provide the encrypted e-mail address and the encrypted password to the authentication server 30. Here, the e-mail address may first be encrypted by the encrypted password.

Here, the member information setting unit 14 may transmit the previously received group code and authentication key together with the encrypted e-mail address and the encrypted password to the authentication server 30.

In addition, the member information setting unit 14 may receive a 'nickname' to be set by the user together when receiving the password. Here, the nickname may be set as a particular string. After receiving the nickname, the member information setting unit 14 is provided with a confirmation as to redundancy of the nickname from the authentication server 30, thereby setting the nickname that is not redundant with that of another user. Here, the member information setting unit 14 may transmit the nickname finally confirmed by the user to the authentication server 30 together with the encrypted password, thereby allowing individual users' nicknames to be registered in the authentication server 30.

As described above, the member information setting unit 14 provides the encrypted e-mail address and the encrypted password and additional information to the authentication server 30, so that the authentication server 30 stores the encrypted information and confirms redundant subscription in an identical e-mail address to then issue a session key to the user terminal 10.

Meanwhile, the user terminal 10 according to an embodiment includes a session maintaining unit 16 which stores and renews the session key issued from the authentication server 30 and transmits the session key to the authentication server 30 when communicating with the authentication server 30 to allow the authentication server 30 to discriminate the user terminal 10, and accordingly offer services.

In addition, the user terminal 10 according to an embodiment may further include a bulletin content display unit 17 sending a request for bulletin content to the authentication server 30, another server operated by the operator of the authentication server 30 or a third party server using an authentication application programming interface (API) provided by the operator of the authentication server 30 and receiving and displaying the requested bulletin content. In sending the request for the bulletin content, the session maintaining unit 16 may read the stored session key and may transmit the read session key to the authentication server 30 or another server or a third party server operated by the operator of the authentication server 30, provided with the same session key with the session key issued from the authentication server 30 to the user terminal 10.

Further, the user terminal 10 according to an embodiment may further include a bulletin content registering unit 18 registering the bulletin content by accepting a new registration of bulletin content from the user and transmitting the newly registered bulletin content to the authentication server 30 or another server operated by the operator of the authentication server 30 or a third party server using an authentication application programming interface (API) provided by the operator of the authentication server 30.

As described above, the session maintaining unit 16 may read the stored session key and may transmit the read session key to the authentication server 30 or another server or the third party server operated by the operator of the authentication server 30, provided with the same session key with the session key issued from the authentication server 30 to the user terminal 10.

Hereinafter, functional configurations of the authentication server 30 performing group authentication and member authentication by communicating with the user terminal 10 according to an embodiment will be described in detail. The authentication server 30 will be described below with reference to FIG. 3. FIG. 3 illustrates a functional configuration of the authentication server 30 performing group authentication according to the first embodiment. The authentication server 30 may be configured such that a group authentication unit 32 includes an e-mail transmission unit 32a and an e-mail authentication unit 32b, which will later be described. However, according to another embodiment, the group authentication unit 32 may be differently configured, which will also be described below.

First, the authentication server 30 may include a subscription request receiving unit 31. If a subscription request is received from the user terminal 10, the subscription request receiving unit 31 receives and records the user's input group code and e-mail address received in the subscription request unit 11 of the user terminal 10 together with the subscription request.

Here, the subscription request receiving unit 31 may connect the received group code and e-mail address with each other using an account to then store the same.

Here, the information received by the subscription request receiving unit 31 may be recorded in 'Table for Subscription'.

The 'Table for Subscription' is a table in which the group code and the e-mail address received from the user terminal 10 together with the subscription request are stored and is used in executing a subscription procedure, including the group authentication and the member authentication. The data recorded in the table for subscription is deleted once the subscription procedure for the corresponding user terminal 10 is completed and a session key is endowed to the user terminal 10.

Types of data recorded in the Table for Subscription are listed below in Table 1.

TABLE 1

Table for Subscription

| Field Name | Description |
| --- | --- |
| Group Code | Code for discriminating user's selected group |
| E-mail Address | Plaintext e-mail address entered by user |
| Authentication key | Pseudorandom key transmitted to user terminal |
| E-mail Authentication Code | Pseudorandom codes to be included in e-mail authentication link (string for authentication) |
| Push Identifier | Discrimination information of application installed in user terminal |
| Group Authentication Success | Information on whether field group authentication has been successfully completed or not |

As described above, the group code and the e-mail address are received by the subscription request receiving unit 31 from the user terminal 10. The authentication key and the e-mail authentication code may be recorded in the table for subscription by being generated by the subscription request receiving unit 31 after the subscription request is received from the user terminal 10.

The information recorded in the table for subscription may be deleted after the lapse of a predetermined period of time unless the user takes an action for the authentication e-mail is taken within the predetermined period of time after sending the authentication e-mail.

Meanwhile, the push identifier may be device discrimination information used by a push server (e.g., GCM of Android operating system (OS) or APNS of iOS), such as a registered ID of the android OS or a device token of the iOS. The device discrimination information may be given each application installed in each user terminal 10 to discriminate the application and receiving a push notification.

Lastly, the 'group authentication success field' will later be described.

Therefore, the subscription request receiving unit 31 temporarily stores the push identifier of the user terminal 10 requesting for subscription in the table for subscription, thereby allowing the authentication e-mail transmittal notification or the authentication e-mail confirmation notification to be transmitted to the user terminal 10 by push technology.

As described above, if the subscription request is received from the user terminal 10 together with the group code and the e-mail address, the subscription request receiving unit 31 may confirm whether the e-mail address format corresponding to the group code and a host address part of the e-mail address received from the user terminal 10 correspond to each other and may generate the authentication key and the e-mail authentication code to be recorded in the table for subscription if the e-mail address format and the host address part correspond to each other.

As described above, the authentication key is an intrinsic pseudorandom key newly generated so as to correspond to the subscription request and may be used for discriminating subscription requests from each other.

The 'e-mail authentication code' is an intrinsic value, such as an authentication key. For example, the e-mail authentication code may be generated as a pseudorandom key of 50 kbytes or greater. Here, the e-mail authentication code is included in the authentication e-mail sent from the e-mail transmission unit 32*a*, which will later be described. In detail, the e-mail authentication code is included in the authentication e-mail as an authentication link that can be selected by the user, so that the user may select (click or touch) the authentication link, which is sensed by the authentication server 30, thereby identifying which e-mail authentication code has been confirmed so as to correspond to the authentication e-mail. The e-mail authentication code may be provided to the user in the format of a string for authentication, included in the main text of the authentication e-mail, rather than in the format of an authentication link, as described above. That is to say, the e-mail authentication code may be provided as one of the authentication link or the authentication string.

According to the first embodiment of group authentication, a field of the e-mail authentication code may be recorded in the table for subscription. According to the second embodiment of group authentication, instead of the field of the e-mail authentication code, a field of the keyword for authentication may be recorded in the table for subscription. In addition, according to the second embodiment of group authentication, if different receiving mail addresses of which different users are notified, a field of the receiving mail addresses of which the respective users are notified may be included in the table for subscription. Meanwhile, according to the third embodiment of group authentication, instead of the field of the e-mail authentication code, a field for recording the identifier or position information of the wireless LAN access point, received from the user may be included in the table for subscription.

Meanwhile, in the authentication server 30, the group authentication unit 32 includes the e-mail transmission unit 32*a*, and the e-mail transmission unit 32*a* may transmit an e-mail including the e-mail authentication code in the format of an authentication link or a string for authentication. For example, the authentication e-mail may include information on whether there is an attempt to member subscription in a given service using the e-mail address to which the authentication e-mail is transmitted, information on subscription approval based on selection of the authentication link (or information on subscription approval based on entry of the string for authentication into the application) and the authentication link (or the string for authentication). Then, if the authentication link is selected or the string for authentication is recorded, the corresponding e-mail authentication code may be transmitted to the authentication server 30, thereby confirming user's approval for a given authentication e-mail.

Here, after transmitting the authentication e-mail, the e-mail transmission unit 32*a* may transmit the authentication e-mail transmittal notification including an authentication key to the user terminal 10 using the push identifier corresponding to the e-mail address to which the authentication e-mail is transmitted.

Further, in the authentication server 30, the group authentication unit 32 may include the e-mail authentication unit 32*b*. After the user confirms the e-mail through the e-mail authentication terminal 20, the e-mail authentication unit 32*b* may select the authentication link or inputs the string for authentication, so that the e-mail authentication code is transmitted to the authentication server 30, a value of the group authentication success field corresponding to e-mail authentication code in the table for subscription may be processed as being successful. Here, a field value that is not recorded in the table for subscription may be recorded or the field value may be changed. That is to say, the 'group authentication success field' is a region for recording a value indicating whether the group authentication has been successful or not as the result of successful e-mail authentication completion.

As described above, if the group authentication success field value is processed as being successful, the e-mail authentication unit 32*b* transmits the authentication key together when the authentication e-mail confirmation notification is transmitted to the user terminal 10 using the corresponding push identifier.

Accordingly, the user terminal 10 may confirm that the group authentication using the authentication e-mail is completed. In particular, the user terminal 10 may confirm whether the first authentication key and the second authentication key included in the authentication e-mail transmittal notification and the authentication e-mail confirmation notification are identical with each other, and an identical authentication key may be transmitted to the authentication server 30 for make a final authentication request only when the first and second authentication keys are identical with each other.

That is to say, the e-mail authentication unit 32*b* may process the group authentication success field value as being successful and may transmit the authentication e-mail confirmation notification to the user terminal 10. Thereafter, if an authentication request including the authentication key is received from the user terminal 10, a response indicating that the group authentication has been successfully completed for the authentication request may be transmitted only when the group authentication success field value is confirmed to be processed as being successful.

That is to say, if the group authentication success field value is processed as being successful in the authentication server 30, the authentication e-mail confirmation notification may be transmitted to allow the user terminal 10 to confirm the successful group authentication, so that the user terminal 10 executes an application and transmits the authentication key to the authentication server 30, thereby confirming whether the authentication has been successfully completed or not.

Meanwhile, according to the second embodiment of group authentication, unlike in FIG. 3, the group authentication unit 32 may include an 'e-mail receiving unit' and an 'e-mail authentication unit'. After the 'e-mail receiving unit' notifies the user terminal 10 of a receiving mail address and a keyword for authentication, which may include a first authentication key, it may receive an authentication e-mail optionally including the keyword for authentication in its main text and having a receiving mail address as a recipient and an e-mail address previously entered by the user as a sender. In addition, if the authentication e-mail is received, the 'e-mail authentication unit' confirms whether the receiving mail address, the e-mail address corresponding to the receiving mail address, and the keyword for authentication correspond to each other in the table for subscription to then process the group authentication success field value as being successful. In addition, when the group authentication success field value is processed as being successful, the e-mail authentication unit may transmit an authentication key (a second authentication key) to the user terminal 10 together with an authentication e-mail confirmation notification.

In addition, according to the third embodiment of group authentication, after receiving the identifier the wireless LAN access point which the user terminal 10 is capable of access and the current position information from the user terminal 10, instead of the e-mail address, the group authentication unit 32 may compare the identifier of the wireless LAN access point and the current position information with a pre-stored identifier of the wireless LAN access point and an off-line address, thereby performing group authentication. If the group authentication has been successfully completed, the group authentication unit 32 may transmit the authentication key to the user terminal 10 while processing the group authentication success field value in the table for subscription as being successful.

Meanwhile, if a response indicating that the group authentication has been successfully completed is received from the authentication server 30, the user terminal 10 provides a user with a screen showing that the group authentication has been successfully completed, thereby allowing a password, a nickname, etc. to be set.

Further, according to an embodiment, the authentication server 30 includes a member information management unit 34. The member information management unit 34 receives the nickname and the password entered by the user through the screen of the user terminal 10, showing that the group authentication has been successfully completed. Here, the password may be transmitted in the encrypted form, as described above.

The member information that is received by the member information management unit 34 from the user terminal 10 is recorded in the following table for members, which has various fields as follows.

TABLE 2

Table for Members

| Field Name | Description |
| --- | --- |
| Member number | Discrimination code for each member |
| Encrypted password | Encrypted password received from user terminal |
| Encrypted e-mail address | Encrypted e-mail address using password received from user terminal |
| Nickname | Nickname received from user terminal |
| Member session key | Pseudorandom key generated and recorded after completion of member subscription |

Here, the member number may be a discrimination code newly generated by the member information management unit 34 when the member information is received from the user terminal 10 and is recorded in the table for members.

As described above, the encrypted password and the encrypted e-mail address may be received from the user terminal 10. Here, the encrypted e-mail address may be a hash value stored in the encrypted form using the password, the e-mail address and optically other additional information for encryption. Here, in encrypting the e-mail address, since the e-mail address is encoded in a unidirectionally encrypted manner, it may not be decoded. Here, when the encrypted e-mail address is stored in the authentication server 30, the e-mail address is stored in the encrypted state so as not to be finally decoded. However, the user terminal 10 first encrypts the user's entered e-mail address in a decodable state to then be transmitted to the authentication server 30, and the authentication server 30 decodes the e-mail address and then encrypts the same in an undecodable manner. Alternatively, since the encrypted e-mail address was transmitted from the user terminal 10 to the authentication server 30, the e-mail address may be transmitted in an encrypted manner so as not be decodable and may then be stored in the authentication server 30 at it is. For example, the encrypted e-mail address is encrypted by the user terminal 10 so as not be decodable using the user's entered password and a salt value set by a service provider, that is, the operator of the authentication server 30.

In addition, the table for members may further include a field in which a group code is recorded.

Meanwhile, the member session key will later be described.

As described above, the member information management unit 34 records and manages the encrypted password, the encrypted e-mail address, the nickname, etc., received from the user terminal 10. Here, the encrypted password may be obtained by decoding the encrypted password received from the user terminal 10 and then encrypting the same in a different manner, as described above.

Meanwhile, the authentication server 30 may include a redundancy processing unit 35. The redundancy processing unit 35 may be configured such that member subscription is redundantly performed when there are redundant subscription requests for the same e-mail address or there is a re-subscription request of a user for which member authentication is completed.

To this end, when a new subscription request is received, the redundancy processing unit 35 may determine whether the e-mail address included in the subscription request is identical with the e-mail address pre-recorded in the table for subscription and may notify the user terminal 10 that has requested for subscription that the new subscription request is a redundant subscription attempt. Likewise, when the new subscription request is received, the redundancy processing unit 35 may determine whether the e-mail address included in the subscription request is identical with the e-mail address pre-recorded in the table for redundancy removal, which will later be described, and may notify the user terminal 10 that the new subscription request is a redundant subscription attempt. Further, when the member information including a password, etc., is received, after the group authentication for the user terminal 10 is completed, the redundancy processing unit 35 may determine whether the e-mail address received from the user terminal 10 is identical with the e-mail address registered in the table for redundancy removal and may notify the user terminal 10 that the new subscription request is a redundant subscription attempt. Here, the redundancy processing unit 35 may encrypt a plaintext e-mail address using the same encryption logic used when the encrypted e-mail address recorded in the table for redundancy removal is encrypted, and may then compare the encrypted e-mail address with the encrypted e-mail address recorded in the table for redundancy removal for determining redundancy.

As described above, when the redundancy processing unit 35 notifies the user terminal 10 that the new subscription request is a redundant subscription attempt, the user terminal 10 may revoke the existing member subscription, may determine whether to make a new member subscription attempt, and may notify the authentication server 30 of the determination result. For example, if there is a request for new member subscription from the user terminal 10 to the same-mail address, the redundancy processing unit 35 may delete all of the existing records associated with the corresponding e-mail address to then perform again a member subscription procedure.

To this end, if the user requests for re-subscription after being notified of the redundant subscription attempt, the user terminal 10 may transmit the subscription request or the member information together with a 'forced flag' to the authentication server 30.

In addition, when the subscription request or the member information for member authentication is received, the redundancy processing unit 35 may delete existing records according the presence or absence of the forced flag even if the same e-mail address is pre-recorded in the table for subscription or the table for redundancy removal, and may perform new group authentication and/or member authentication or may ignore the subscription request or registration of member information.

Here, the table for redundancy removal may have various fields as follows.

TABLE 3

Table for Redundancy Removal

| Field Name | Description |
|---|---|
| Encrypted e-mail address | Undecodable |
| E-mail session key | Pseudorandom key generated when authentication has been successfully completed |

The respective fields of the table for redundancy removal may be recorded by encrypting the e-mail address when authentication of an arbitrary user terminal 10 has been successfully completed, and newly generating an e-mail session key.

Meanwhile, the authentication server 30 according to an embodiment may include a session management unit 36.

The session management unit 36 may newly generate and manage the 'member session key' of the table for members and the 'e-mail session key' of the table for redundancy removal.

Here, the member session key is synchronized with a member session key provided to the user terminal 10 and stored, and the session management unit 36 may discriminate a member using the member session key received from the user terminal 10 and may offer a service.

In addition, the e-mail session key is a session key stored in the table for redundancy removal and may be provided to the user terminal 10 and stored, like the member session key.

As described above, the e-mail session key and the member session key are separately provided because there is no information associated with the table for members and the table for redundancy removal for membership determination, the data deleted when the redundancy removal is performed is only the e-mail session key of the table for redundancy removal, and it is not possible for the redundancy processing unit 35 to delete the data due to impossible confirmation of the pertinent member session key.

Therefore, since the member session key received from the user terminal 10 exists in the table for members and the e-mail session key exists in the table for redundancy removal, two different session keys are issued to be used for offer the service only when both of the member session key and the e-mail session key are effective.

That is to say, even if only the e-mail session key is deleted during the redundancy removal and the member session key is confirmed to be effected, the session management unit 36 may not offer the service in response to a service request including the e-mail session key deleted later.

Further, the authentication server 30 according to an embodiment may include a bulletin content management unit 37. The bulletin content management unit 37 may receive and store bulletin contents registered from the user terminal 10. Here, the respective bulletin contents may be divided according to group codes.

The table for bulletin content management may include, for example, fields for ID numbers of the bulletin contents and numbers of members who have registered the registered reply comments.

In addition, the bulletin content management unit 37 may also manage reply comments for the respective bulletin contents. To this end, the authentication server 30 may include a reply comment table.

The reply comment table may include fields for ID numbers of the reply comments, ID numbers of the bulletin contents on which the reply comments are dependent, and numbers of members who have registered the reply comments.

Meanwhile, the authentication server 30 according to an embodiment may include a bulletin content providing unit 38. The bulletin content providing unit 38 may provide the bulletin contents and reply comments managed using the bulletin content table and the reply comment table according to the request from the user terminal 10.

Here, the bulletin content providing unit 38 may notify a posting user of a new event, such as registration of a reply comment for bulletin content prepared by the posting user. To this end, the authentication server 30 may include a push information table.

The push information table may include fields for ID numbers of the respective bulletin contents and push identifiers of the user terminal 10 having registered the bulletin contents.

Here, the data associated with the respective members may not be included in the push information table.

Therefore, as described above, even if the respective tables registered in the authentication server 30 are all exposed, since data pieces being in systematically corresponding relationships and user information are not included in the respective tables, it is not possible to know who is a service user, specifically a posting user of particular bulletin content.

In addition, in the above-described embodiment, an authentication key, a session key and other member information may be exchanged in such a state as originally generated or entered when they are exchanged between the user terminal 10 and the authentication server 30. However, it is evident that the authentication key, the session key and other member information may be exchanged such that one party that generates or enter information transmits the information to the other party in an encrypted state and the other party decodes the received information to be used.

Meanwhile, in a case where a group authentication method is executed without using an e-mail address in certain embodiments herein, that is, in the third embodiment of group authentication, an e-mail address for preventing redundant subscription may be separately entered by the user or discrimination information other than the e-mail address may be received, thereby performing redundancy removal. Alternatively, the redundancy removal may not be performed.

Hereinafter, an authentication method using the authentication system according to an embodiment will be described with reference to the accompanying drawings.

Figure 4:
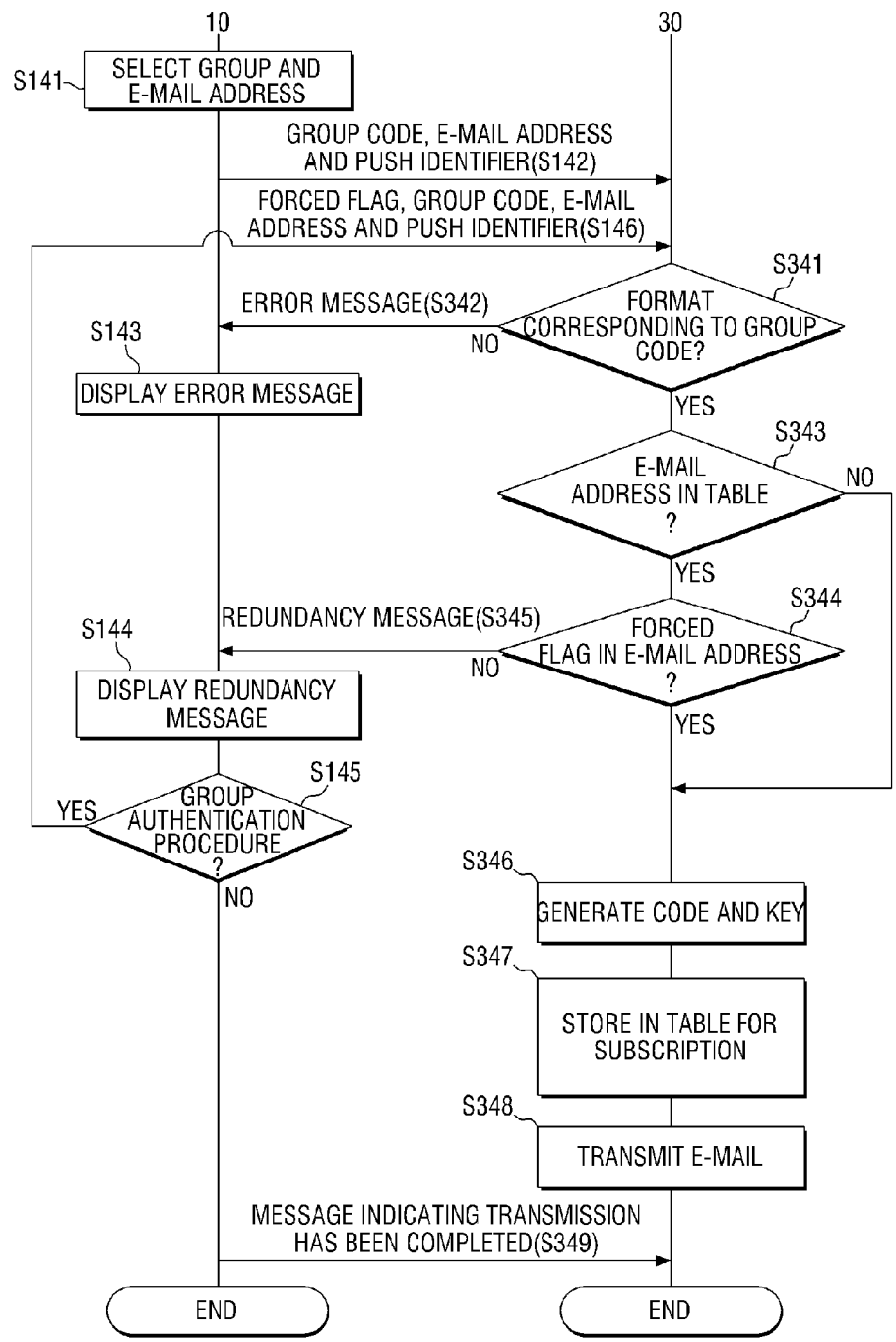
FIG. 4 is a flowchart sequentially illustrating a process of transmitting an e-mail for group authentication according to a subscription request from a user in an authentication method according to an embodiment of the invention.
Figure 5:
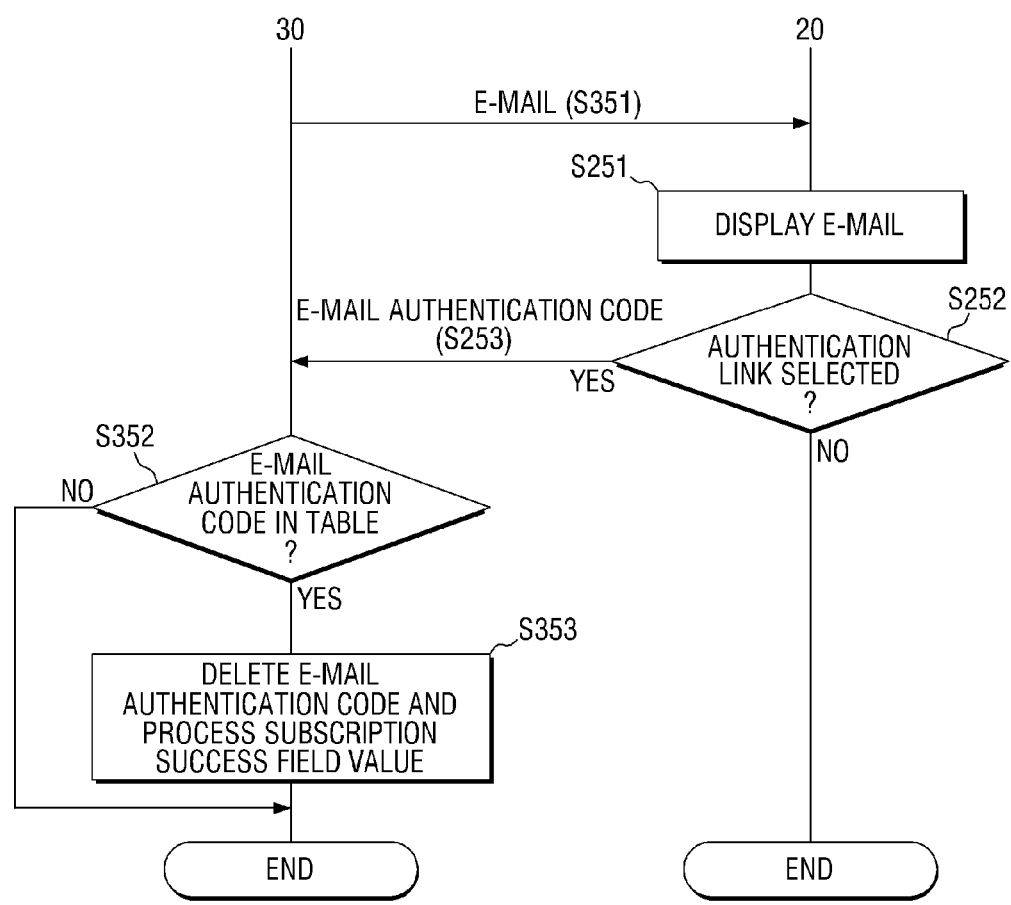
FIG. 5 is a flowchart sequentially illustrating a process of receiving an e-mail authentication code required for group authentication using an e-mail in the authentication method according to an embodiment of the invention.
Figure 6:
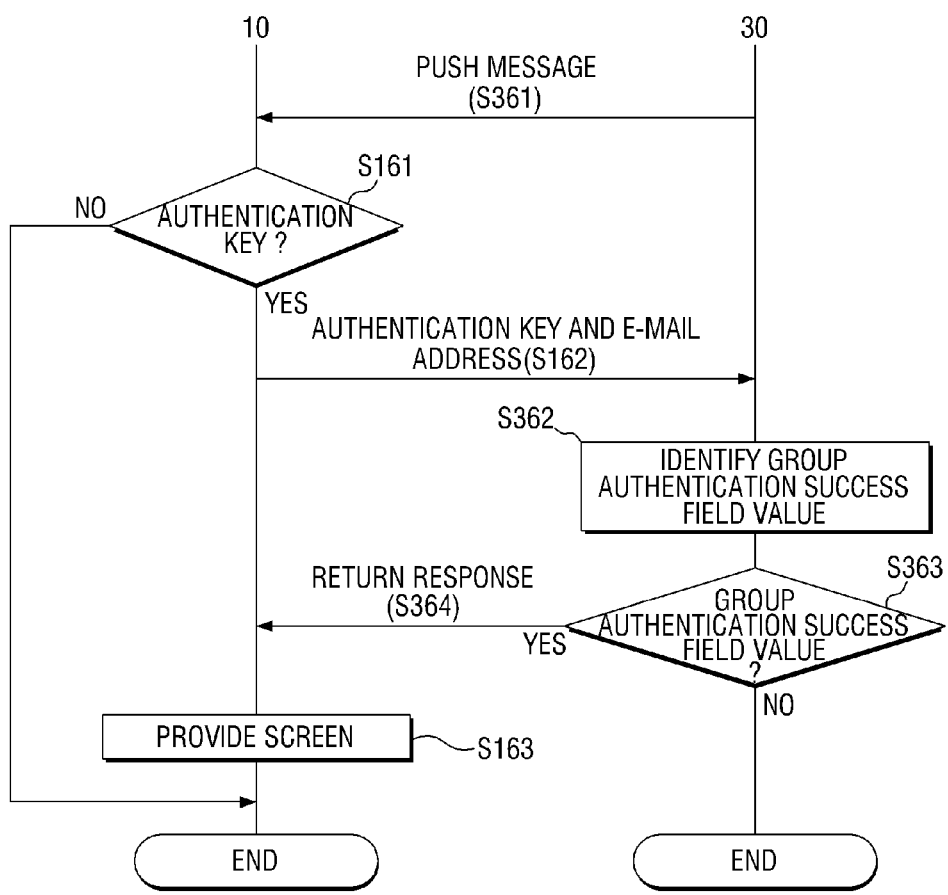
FIG. 6 is a flowchart sequentially illustrating a process of performing group authentication using an e-mail authentication code in the authentication method according to an embodiment of the invention.
Figure 7:
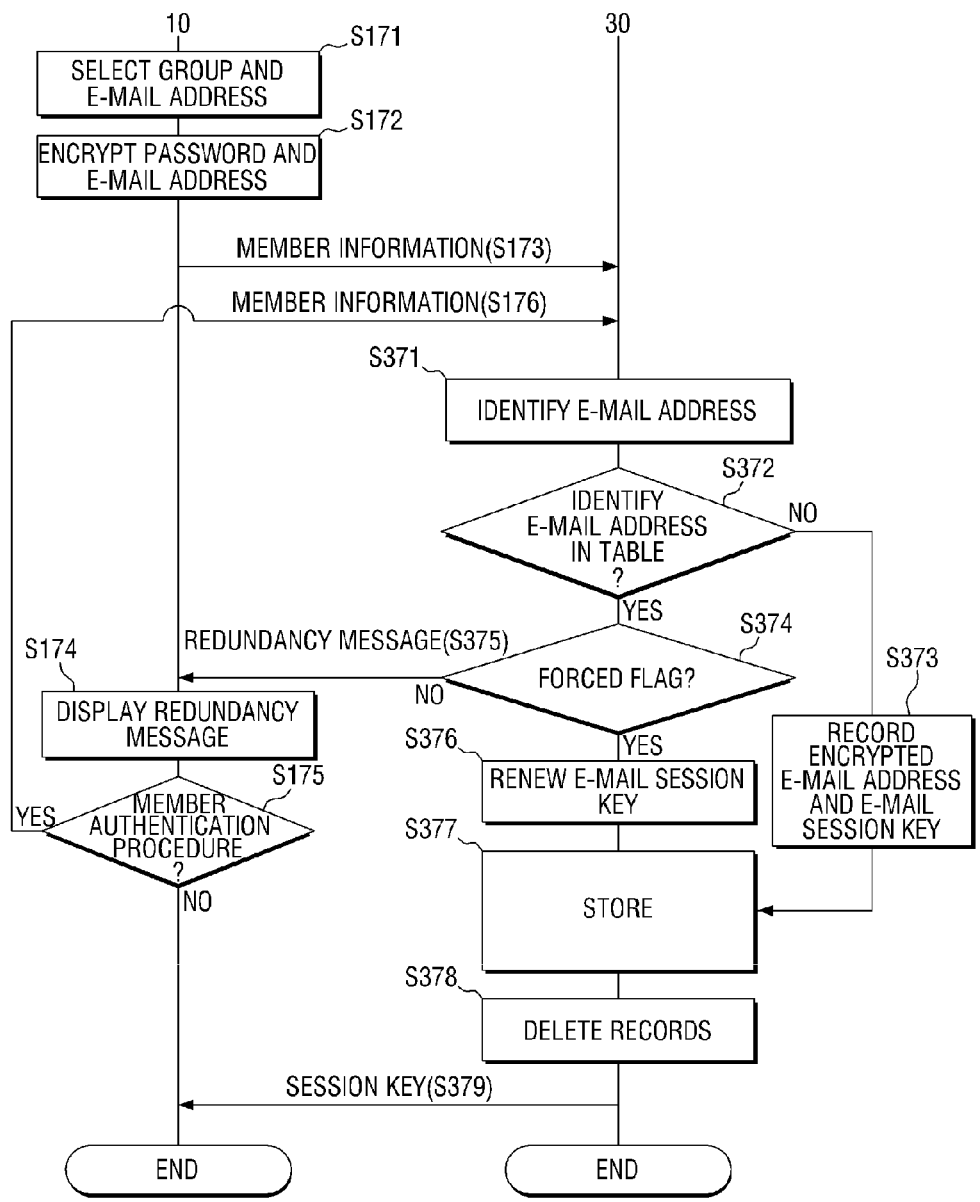
FIG. 7 is a flowchart sequentially illustrating a process of performing member authentication for issuing a session key to a user terminal in the authentication method according to an embodiment of the invention.
Figure 8:
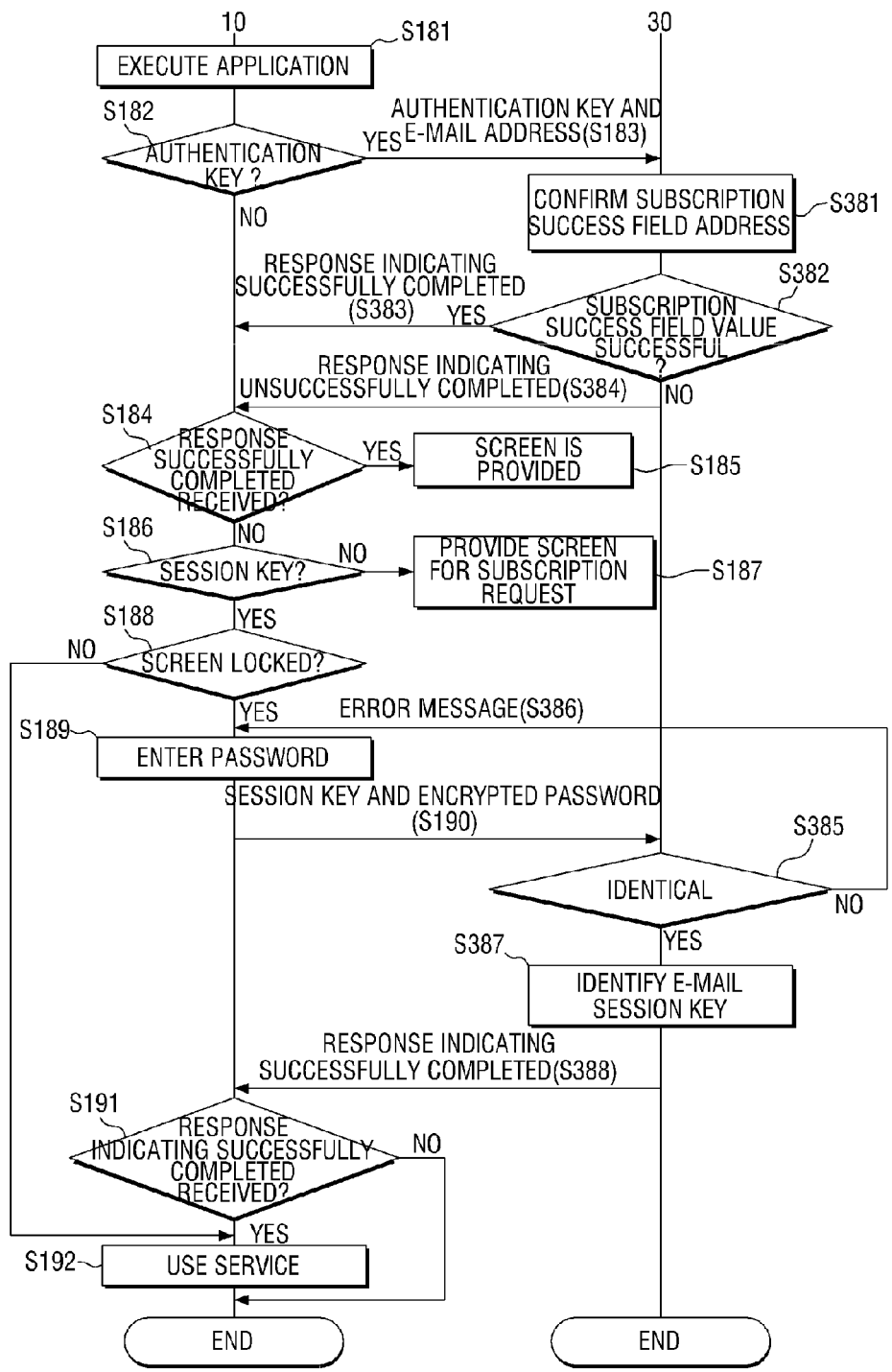
FIG. 8 is a flowchart illustrating steps performed after executing an application installed in a user terminal in a time series manner in the authentication method according to an embodiment of the invention.

FIG. 4 is a flowchart sequentially illustrating a process of transmitting an e-mail for group authentication according to a subscription request from a user in an authentication method according to an embodiment, FIG. 5 is a flowchart sequentially illustrating a process of receiving an e-mail authentication code required for group authentication using an e-mail in the authentication method according to an embodiment, and FIG. 6 is a flowchart sequentially illustrating a process of performing group authentication using an e-mail authentication code in the authentication method according to an embodiment. FIG. 7 is a flowchart sequentially illustrating a process of performing member authentication for issuing a session key to a user terminal in the authentication method according to an embodiment and FIG. 8 is a flowchart illustrating steps performed after executing an application installed in a user terminal in a time series manner in the authentication method according to an embodiment.

The following description will be described with regard to the first embodiment of group authentication, in which the group authentication is executed by transmitting an authentication e-mail including an authentication code, but aspects of the present invention are not limited thereto. Rather, the authentication method may also be executed using easily replaceable methods in addition to the methods according to the first to third embodiments of group authentication group authentication.

First, as shown in FIG. 4, if the user enters or selects a group and an e-mail address through a screen of the user terminal 10 for a subscription request (S141), the user terminal 10 transmits the group code and e-mail address corresponding to the group and a push identifier allocated to an application of the user terminal 10 to the authentication server 30 (S142).

Accordingly, the authentication server 30 records the received e-mail address, the group code, the push identifier, etc. in the table for subscription and then determines whether the e-mail address is in the format corresponding to the group code (S341).

If a host address included in the e-mail address is not in the e-mail address format corresponding to the group code, the authentication server 30 transmits an error message to the user terminal 10 (S342), and the user terminal 10 may display the received error message (S143).

Meanwhile, as the result of the determining in step S341, if it is determined that the e-mail address is in the format corresponding to the group code, the authentication server 30 may determine whether the e-mail address corresponding to the received e-mail address is pre-registered in the table for redundancy removal or not (S343).

If the e-mail address corresponding to the received e-mail address is pre-registered in the table for redundancy removal, the authentication server 30 may determine whether a forced flag is included in the information received from the user terminal 10 (S344). If it is determined that the forced flag is included in the information received from the user terminal 10, the authentication server 30 may notify the user terminal 10 that the subscription request is redundant (S345).

If a redundancy message including a notification of the redundant subscription request is received, the user terminal 10 displays the redundancy message (S144) to allow the user to select to continue to proceed with the subscription procedure or to give up the subscription procedure.

If it is determined that the user selects to continue to proceed with the group authentication procedure (S145), the user terminal 10 transmits the group code including the forced flag, the e-mail address and the push identifier back to the authentication server 30 (S146).

Accordingly, steps S341, S343 and S344 are performed again in the authentication server 30.

Meanwhile, in step S343, if it is determined that the e-mail address included in the subscription request is not registered in the table for redundancy removal, or in step S344, if it is determined that the forced flag is included in the subscription request received from the user terminal 10, the authentication server 30 generates the e-mail authentication code and the authentication key corresponding to the subscription request (S346) to then be recorded in the table for subscription together with information pieces included in the subscription request (S347).

Here, in steps S346 and S347, according to the second embodiment of group authentication, a receiving mail address and a keyword for authentication may be respectively generated to then be recorded in the table for subscription.

Next, the authentication server 30 transmits an authentication e-mail including an e-mail authentication code (S348), and the authentication key corresponding to the subscription request may be transmitted to the user terminal 10 together with the authentication e-mail transmittal notification (S349). Meanwhile, after receiving the authentication key, the user terminal 10 may store the received authentication key.

Here, in steps S348 and S349, according to the second embodiment of group authentication, the authentication key may be transmitted to the user terminal 10 while notifying the user terminal 10 of the information on the receiving mail address and the keyword for authentication. Accordingly, the authentication key may be stored in the user terminal 10 and the user may transmit the authentication e-mail to the authentication server 30 using the user terminal 10 or other types of terminals.

Meanwhile, if the authentication e-mail is transmitted in the above-described manner (S351), thereafter, as shown in FIG. 5, the e-mail authentication terminal 20 receives the transmitted authentication e-mail and displays the e-mail including an authentication link including the e-mail authentication code (or a string for authentication including the authentication code) (S251). Here, as described above, the e-mail authentication terminal 20 may be the same terminal with the user terminal 10.

If the user of the e-mail authentication terminal 20 selects the authentication link or enters the string for authentication through the application installed in the user terminal 10 in a state in which the authentication e-mail is displayed (S252), the e-mail authentication code corresponding to the selected authentication link (or the entered string for authentication) to the authentication server 30 (S253).

Here, according to the second embodiment of group authentication, steps S351 to S253 may be replaced with steps of the authentication server 30 notifying the user terminal 10 of the information on the receiving mail address and the keyword for authentication and transmitting the authentication e-mail having the notified receiving mail address as a recipient and including the keyword for authentication in its main text to the authentication server 30.

Accordingly, the authentication server 30 searches for an e-mail authentication code identical with the e-mail authentication code received from the table for subscription and then processes a group authentication success field value corresponding to the searched e-mail authentication code as being successful (S353).

However, if an e-mail authentication code identical with the e-mail authentication code received from the table for subscription is not searched for, a received signal is ignored.

According to the second embodiment, in step S353, the authentication server 30 compares information on the sender and recipient of the authentication e-mail, entered by the user, and the keyword included in the main text of the authentication e-mail with the information recorded in the table for subscription and processes the group authentication success field value as being successful or unsuccessful.

Meanwhile, the authentication server 30 may transmit a push message including the corresponding authentication key, that is, the authentication e-mail confirmation notification, using the corresponding push identifier for the subscription request having the group authentication success field value processed as being successful in step S353 of FIG. 5 (S361).

Accordingly, as the result of the user terminal 10 comparing the authentication key received in step S349 of FIG. 4 with the authentication key received in step S361 of FIG. 6, if it is determined that both of the authentication keys are identical with each other (S161), the identical authentication key and the e-mail address are transmitted to the authentication server 30 (S162).

Accordingly, the authentication server 30 identifies the group authentication success field value corresponding to the authentication key received in step S162 (S362), and it is confirmed that the group authentication success field value has been processed as being successful (S363), a response indicating that the group authentication has been successfully completed is returned to the user terminal 10 (S364).

Accordingly, a screen showing that the group authentication has been successfully completed, that is, a screen allowing the user to enter member information, including a nickname and a password, is provided to the user terminal 10 (S163).

In such a manner, the group authentication is completed.

Meanwhile, as shown in FIG. 7 if the screen for entering the nickname and the password is provided to the user terminal 10 after the group authentication is completed, the user terminal 10 may receive the nickname and the password from the user (S171).

Next, the user terminal 10 encrypts the e-mail address using the entered password and also encrypts the password itself (S172).

Then, the user terminal 10 transmits the member information including the encrypted e-mail address, the encrypted password, the nickname, the group code, etc., and a pre-issued authentication key, to the authentication server 30 (S173).

Here, the user terminal 10 may first encrypt the user's entered e-mail address in a decodable state to then be transmitted to the authentication server 30, and the authentication server 30 decodes the e-mail address and then encrypts the same in an undecodable manner. Alternatively, since the encrypted e-mail address was transmitted from the user terminal 10 to the authentication server 30, the e-mail address may be transmitted in an encrypted manner so as not be decodable and may then be stored in the authentication server 30 at it is.

The authentication server 30 may identify the e-mail address corresponding to the authentication key from the table for subscription using the authentication key received together with the member information (S371).

If the e-mail address stored in the table for subscription in the format of a plaintext is identified, the authentication server 30 confirms whether the corresponding e-mail address is pre-registered in the table for redundancy removal using the identified e-mail address (S372). In step S372, the plaintext e-mail address may be encrypted using the same encryption logic used when the encrypted e-mail address recorded in the table for redundancy removal is encrypted, and the encrypted e-mail address may then be compared with the encrypted e-mail address recorded in the table for redundancy removal. Here, the encryption logic used in encrypting the e-mail address may be determined or changed by the operator of the authentication server 30.

If it is confirmed in step S372 that the e-mail address is redundant, the authentication server 30 confirms whether a forced flag is included in the member information or not, and if the forced flag is not included in the member information, a redundancy message is transmitted to the user terminal 10 (S375) to notify the user terminal 10 that there are redundant subscription attempts for the same e-mail address.

The user terminal 10 having received the redundancy message displays the received redundancy message (S174) to allow the user to retry a subscription attempt using the same e-mail address or to give up subscription.

If the user terminal 10 intends to quit proceeding with the subscription procedure for completion of member authentication, the rest steps of the subscription procedure are all interrupted. However, if there is a user input from the user terminal 10 to continue to proceed with the subscription procedure (S175), the user terminal 10 transmits again the member information and the authentication key transmitted in step S173 together with the forced flag (S176).

Accordingly, the authentication server 30 receives the member information, the authentication key and the forced flag and executes again steps S371 to S374.

If it is determined in step S372 that the e-mail address is not included in the table for redundancy removal, the authentication server 30 records the e-mail address in the table for redundancy removal by newly generating an e-mail session key and encrypting the newly generated e-mail address (S373).

Meanwhile, if it is determined in step S372 that the same e-mail address is included in the table for redundancy removal but it is determined in step S374 that the forced flag is included in the member information, the authentication server 30 renews and stores the new e-mail session key corresponding to the e-mail address of the table for redundancy removal (S376).

Next, the authentication server 30 may record the received member information in the table for members and may generate and store the member session key (S377).

In such a manner, if the group authentication is completed for the user terminal 10 having requested for subscription, registration of the member information and issuance of the session key are performed and the member authentication procedure is completed, the authentication server 30 deletes all of the data associated subscription, recorded in the table for subscription (S378) and the e-mail session key and the member session key are issued to the user terminal 10.

Accordingly, the user terminal 10 may store the session keys. Here, the user terminal 10 may delete all of the temporarily stored data, including e-mail addresses or group codes, while issuing the session keys.

Meanwhile, in the above-described embodiments, the group authentication procedure and the member authentication procedure are divided into several steps and are described with regard to process steps of the authentication server 30 performed in a time series manner. However in the following description, the group authentication procedure and the member authentication procedure will be described with regard to the user terminal 10 with reference to FIG. 8.

As shown in FIG. 8, if an application is executed in the user terminal 10 (S181), the user terminal 10 checks whether there is a pre-issued authentication key (S182).

Here, since the authentication key is deleted from the user terminal 10 due to issuance of a session key, the existence of the authentication key may mean that a session key for the corresponding user terminal 10 has not yet been issued, that is, a subscription procedure has not been completed.

Therefore, if it is confirmed in step S182 that the authentication key is stored in the user terminal 10, the user terminal 10 may receive the authentication key and the e-mail address entered by the user and stored to the authentication server 30 (S183).

Accordingly, the authentication server 30 may confirm the group authentication success field value corresponding to the authentication key received from the table for subscription (S381).

It is confirmed whether a subscription success field value has been processed as being successful or not (S382).

Then, the authentication server 30 may transmit a response indicating that the group authentication has been successfully completed or a response indicating that the group authentication has unsuccessfully completed to the user terminal 10 according to whether the group authentication success field value has been processed as being successful or unsuccessful (S383 and S384).

Accordingly, if the response indicating that the group authentication has been successfully completed is received in the user terminal 10 (S184), a screen showing that the group authentication has been successfully completed, that is, a screen allowing the user to enter member information, including a nickname and a password for performing member authentication, is provided, and steps shown in FIG. 7 may be performed.

In addition, in a case where there is no authentication key or there is an authentication key but group authentication has failed (in a case where there is no session key), the user terminal 10 may display a subscription request screen (S187). Accordingly, a new group and a new e-mail address are received to execute again steps following on and after the group authentication procedure shown in FIGS. 4 to 6.

Meanwhile, in a case where no authentication key exists in the user terminal 10 but a session key exists in the user terminal 10, the user terminal 10 may use the service using the session key (S192).

Optionally, in order to use the service even if the session key exists in the user terminal 10, a screen lock may be cancelled. If the screen is locked (S188), the user terminal 10 may provide the user with a user interface to enter a password (S189).

Accordingly, the password entered by the user may be encrypted and then transmitted to the authentication server 30 together with the session key (S190).

The authentication server 30 having received the password and the session key may search for a member session key identical with the received session key from the table for members and may compare the encrypted password corresponding to the member searched for from the table for members with the encrypted password received in step S190 (S383).

If the two passwords are not identical with each other, the authentication server 30 may transmit an error message to the user terminal 10.

Meanwhile, if it is confirmed in step S383 that the two passwords are not identical with each other, the authentication server 30 identifies whether the e-mail session key is effective in the table for redundancy removal (S385), a response indicating that authentication has been successfully completed may be transmitted to the user terminal 10.

Accordingly, the user terminal 10 receives the response indicating that authentication has been successfully completed (S191), and may normally use the service (S192).

Meanwhile, in the authentication method having been described with reference to FIGS. 4 to 8, if the group authentication method is replaced by the group authentication method according to the third embodiment, the group authentication procedure shown in FIGS. 4 to 8 is executed such that the authentication server 30 receives the group code and the identifier of the wireless LAN access point and the current position information from the user terminal 10 and the identifier of the wireless LAN access point and the current position information are compared with a pre-stored identifier of the wireless LAN access point and an off-line address, and if the compared information pieces are matched with each other, the group authentication success field value is processed as being successful and an authentication key is then generated and transmitted to the user terminal 10. In order to prevent redundant member subscription, like in the first or second embodiment, an e-mail address entered by the user may be registered. However, the e-mail address may not be used in group authentication but may be used in redundancy removal. The information required for redundancy removal may be replaced by other information, such as employee numbers, in addition to the e-mail address.

The authentication method according to the embodiment shown in FIGS. 4 to 8 includes process steps performed in a time series manner by the authentication system shown in FIGS. 1 to 3. Therefore, even when omitted in the following description, the aforementioned content regarding the authentication system shown in FIGS. 1 to 3 may also be applied to the authentication method according to the embodiment shown in FIGS. 4 to 8.

The authentication method according to the embodiment shown in FIGS. 4 to 8 may be embedded in the form of a recording medium which includes computer executable command languages, such as a program module executed by a computer. A computer-readable storage medium may be a useable medium that may be accessed by a computer and may include any or all of volatile and non-volatile media and/or a separable and inseparable media. Further, the computer-readable storage medium may include any or all of a computer storage medium and a communication medium. The computer-readable storage medium may include any or all of volatile and non-volatile media or a separable and inseparable media embodied by an arbitrary method or technology for storing information such as computer-readable command languages, data structures, program modules, and/or other data. The communication medium may typically include any one or more of computer-readable command languages, data structures, program modules, and/or other data which relates to a modulated data signal such as carrier waves, or other transmission mechanism, and may also include a particular information forwarding medium.

In addition, the authentication method according to an embodiment may be embodied by a computer program (or a computer program product) which includes computer executable command languages. The computer program includes programmable machine command languages processed by a processor and may be implemented by a high-level programming language, an object-oriented programming language, an assembly language or a machine language. In addition, the computer program may be recorded in a visible computer-readable recording medium (for example, a memory, a hard disk, a magnetic/optical medium or a solid-state drive (SSD), etc.).

Therefore, the authentication method according to an embodiment may be implemented by executing the computer program by a computing device. The computing device may include at least some of a processor, a memory, a storage device, a high-speed interface connected to the memory and a high-speed extension port, and a low-speed interface connected to a low-speed bus and the storage device. The respective elements may be connected to one another using various buses and may be mounted on a common mother board or may be mounted in another appropriate manner.

Here, the processor may process command languages in the computing device. The command languages may include, for example, commands stored in a memory or a storage device to display graphic information for providing a graphic user interface (GUI) to an external input or output device, like a display connected to a high-speed interface. Alternatively, a plurality of processors and (or) a plurality of buses may be appropriately used with a plurality of memories and memory formats. In addition, the processors may be embodied by a chip set consisting of chips including in a plurality of independent analog and (or) digital processes.

In addition, the memory may store information in the computing device. In an example, the memory may be composed of volatile memory units or a set thereof. In another example, the memory may be composed of non-volatile memory units or a set thereof. In addition, the memory may be other types of computer-readable media, such as magnetic or optical disks.

The storage device may provide a computing device with a large-capacity storage space. The storage device may include a computer-readable medium or the like. In addition, the storage device may include, for example, devices embedded in a storage area network (SAN) and others. Examples of the storage device may include a floppy disk device, a hard disk device, an optical disk device, a tape device, a semiconductor memory device, such as a flash memory, or the like, or a device array.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims. For example, the respective functional elements described as unitary forms may be executed in a distributed fashion. In addition, and the respective functional elements described may be executed in a combined fashion.

What is claimed is:

1. A method for authentication comprising:
receiving a subscription request from a user terminal, the subscription request including a group code and a plaintext e-mail address;
storing the plaintext e-mail address included in the subscription request in a table for subscription;
when the group code and the plaintext e-mail address correspond to each other, performing a group authentication procedure on the user terminal;
when the group authentication procedure for the user terminal is successful:
issuing an authentication key for the subscription request and storing the authentication key in the table for subscription;
transmitting the authentication key to the user terminal;
receiving, from the user terminal, member information including an encrypted plaintext e-mail address of the user with the authentication key;
searching the plaintext e-mail address using the authentication key in the table for subscription;
encrypting the searched plaintext e-mail address using a same encryption logic used when an encrypted e-mail address recorded in the table for redundancy removal is encrypted ; and
checking whether the encrypted searched plaintext e-mail address exists in a table for redundancy removal;
when the encrypted searched plaintext e-mail address exists in the table for redundancy removal, transmitting a redundancy message to the user terminal;
when the encrypted searched plaintext e-mail address is not in the table:
issuing a member session key and e-mail session key;
storing the encrypted searched plaintext e-mail address and e-mail session key in the table for redundancy removal;
storing the encrypted plaintext e-mail address in the member information and the member session key in a table for members;
transmitting the member session key and the e-mail session key, to the user terminal; and
deleting data of the table for subscription for the subscription request; and
providing a service requested by the user terminal in response to a service request including the member session key and the e-mail session key when the member session key is in the table for members and the e-mail session key is in the table for redundancy removal.

2. The method of claim 1, wherein the group authentication procedure comprises sending an e-mail including an authentication code to the plaintext e-mail address if the group code and a host information included in the plaintext e-mail address correspond to each other; and
processing the group authentication procedure for the user terminal as being successful if discrimination of the authentication code included in the sent e-mail is detected.

3. The method of claim 1, wherein the group authentication procedure comprises providing the user terminal with information on a receiving mail address to which an authentication e-mail is to be addressed if the group code and a host information included in the plaintext e-mail address correspond to each other; and processing the group authentication procedure for the user terminal as being successful if the authentication e-mail is received in the receiving mail address as a recipient.

4. The method of claim 1, wherein receiving a subscription request comprises receiving at least one of an identifier of a wireless LAN access point which the user terminal is capable of access and position information of the user terminal.

5. The method of claim 1, wherein the member information of the user includes an encrypted password and the plaintext e-mail address encrypted by the password from the user terminal, and
the receiving member information comprises, recording the received member information in the table for members before deleting the data.

6. The method of claim 1, wherein the receiving of the subscription request comprises receiving the subscription request together with a push identifier of the user terminal.

7. The method of claim 6, wherein the receiving of the subscription request further comprises storing the group code and the plaintext e-mail address included in the subscription request and received together, and the push identifier in the table for subscription.

8. The method of claim 1, wherein the receiving of the subscription request comprises:
generating the authentication key to be issued to the user terminal so as to correspond to the subscription request.

9. The method of claim 8, wherein the group authentication procedure as being successful comprises transmitting an e-mail confirmation notification including the authentication key to the user terminal using a push identifier after the processing of the group authentication procedure as being successful.

10. The method of claim 9, wherein the receiving of the member information comprises transmitting a response indicating that the group authentication has been successfully completed to the user terminal if an authentication request including the authentication key from the user terminal is received.

11. The method of claim 9, wherein the issuing of the member session key comprises confirming the plaintext e-mail address registered in the table for subscription so as to correspond to the authentication key received from the user terminal, generating the e-mail session key corresponding to the confirmed plaintext e-mail address.

12. The method of claim 1, wherein the receiving of the member information comprises:
confirming whether the encrypted plaintext e-mail address is identical with the stored encrypted e-mail address in the table for redundancy removal;
if the encrypted plaintext e-mail address is identical with the stored encrypted e-mail address in the table for redundancy removal, notifying the user terminal of a redundant subscription request to determine whether to proceed an authentication procedure; and
if there is a request for authentication procedure from the user terminal, renewing and storing the e-mail session key corresponding to the encrypted plaintext e-mail address is identical with the stored encrypted e-mail address in the table for redundancy removal.

13. The method of claim 1, wherein the providing of the service comprises:
receiving the service request including the member session key and the encrypted password from the user terminal;
confirming from the table for members the recorded encrypted password so as to correspond to the member session key; and
providing the service requested by the user terminal only when the encrypted password included in the service request is identical with the encrypted password recorded in the table for members.

14. A non-transitory computer-readable medium with instructions stored therein which upon execution instruct at least one processor to:
receive a subscription request from a user terminal, the subscription request including a group code and a plaintext e-mail address;
store the plaintext e-mail address included in the subscription request in a table for subscription;
when the group code and the plaintext e-mail address correspond to each other, perform a group authentication procedure on the user terminal and processing the group authentication procedure as being successful;
when the group authentication procedure for the user terminal is processed successfully:
issue an authentication key for the subscription request and storing the authentication key in the table for subscription;
transmit the authentication key to the user terminal;
receive, from the user terminal, member information including an encrypted plaintext e-mail address of the user with the authentication key;
search the plaintext e-mail address using the authentication key in the table for subscription;
encrypt the searched plaintext e-mail address using the same encryption logic used when an encrypted e-mail address recorded in the table for redundancy removal is encrypted; and
check whether the encrypted searched plaintext e-mail address exists in a table for redundancy removal;
when the encrypted searched plaintext e-mail address exists in the table for redundancy removal, transmit a redundancy message to the user terminal;
when the encrypted searched plaintext e-mail address is not in the table for redundancy removal:
issue a member session key and e-mail session key;
store the encrypted searched plaintext e-mail address and e-mail session key in the table for redundancy removal;
store the encrypted plaintext e-mail address in the member information and the member session key in a table for members;
transmit the member session key and the e-mail session key, to the user terminal; and
delete the data of the table for subscription for the subscription request; and
provide a service requested by the user terminal in response to a service request including the member session key and the e-mail session key, only when the member session key is exist in the table for members and the e-mail session key is exist in the table for redundancy removal.

* * * * *